United States Patent [19]
Oda et al.

[11] Patent Number: 5,424,891
[45] Date of Patent: Jun. 13, 1995

[54] LEAKAGE FLUX SHIELDING STRUCTURE OF DISK UNIT

[75] Inventors: Kazuya Oda; Takeshi Sato, both of Fukushima; Kazuo Hasegawa, Kanagawa, all of Japan

[73] Assignee: Mitsubishi Denki Kabushiki Kaisha, Tokyo, Japan

[21] Appl. No.: 123,580

[22] Filed: Sep. 17, 1993

Related U.S. Application Data

[63] Continuation of Ser. No. 799,360, Nov. 27, 1991, abandoned.

[30] Foreign Application Priority Data

Nov. 29, 1990 [JP] Japan .................................. 2-332234

[51] Int. Cl.⁶ .............................................. G11B 25/04
[52] U.S. Cl. ...................................... 360/128; 360/137
[58] Field of Search ............. 360/128, 129, 137, 97.01

[56] References Cited

U.S. PATENT DOCUMENTS 4,578,606 3/1986 Welterlin ...................... 310/68 R

FOREIGN PATENT DOCUMENTS

| | | |
|---|---|---|
| 3144629 | 11/1981 | Germany . |
| 59-113568 | 6/1984 | Japan . |
| 59-217271 | 12/1984 | Japan . |
| 2-46583 | 2/1990 | Japan . |
| 2245108 | 12/1991 | United Kingdom . |
| WO87/03347 | 6/1987 | WIPO . |

OTHER PUBLICATIONS

Was man uber Hard-disk-Laufwerke Wissen Sollte, Dipl.-Ing. FH Ludwig Loibl.

Primary Examiner—John H. Wolff
Attorney, Agent, or Firm—Wolf, Greenfield & Sacks

[57] ABSTRACT

A flexible disk unit having a reduced thickness includes a spindle motor for rotating a magnetic recording medium having a magnet at its outer periphery, a movable carriage supporting a magnetic head and a stator surrounding the spindle motor and including a coil opposed to the magnet. The stator has a recess which is adapted to surround the tip of the movable carriage when the carriage is moved towards the magnetic recording medium. A head shield portion is disposed between the stator and the magnetic for shielding leakage flux in the direction of the magnetic head.

65 Claims, 10 Drawing Sheets

LEAKAGE FLUX SHIELDING STRUCTURE OF DISK UNIT

This application is a file wrapper continuation of application Ser. No. 07/799,360 filed Nov. 27, 1991, now abandoned.

BACKGROUND OF THE INVENTION

1. Field of the Invention

The present invention relates to the leakage flux shielding structure of a flexible disk unit having a reduced thickness.

2. Description of the Prior Art

FIG. 8 is a diagram showing the positional relationship of the spindle motor, carriage assembly and stepping motor of a flexible disk unit of the prior art. FIG. 9 is a sectional view illustrating the positional relationship between the spindle motor and the carriage of the flexible disk unit. FIG. 10 is a diagram showing the whole configuration of the flexible disk unit. In these figures, reference numeral 1 represents a spindle motor for rotating a magnetic recording medium (unshown), 1a driving magnet, 1b starer, 1c coil, 1d spindle motor substrate, 1e chucking hub, 1f rotation axis, 2 frame, 3 carriage assembly, 3a carriage for mounting a magnetic head 3c, 3b arm for mounting a magnetic head 3d, 4 stepping motor for positioning the carriage assembly 3 in the radial direction of the medium, 5 sensor, 4a lead screw directly connected to the rotation axis of the stepping motor 4, 6 slide cam, 7 cartridge holder, 8 lever, 9 substrate, 10 shield cover and 11 front panel.

The operation of the flexible disk unit will be described next. In FIG. 10, when the magnetic recording medium (unshown) is inserted into the unit, the medium is loaded onto the read-write position by a loading mechanism consisting of the slide cam 6, the cartridge holder 7 and the lever 8. The detailed explanation of the loading mechanism is omitted here. When the medium is placed in the loading position, the hub of the medium is chucked by the chucking hub 1e of the spindle motor 1 fixed to the frame 2, and the medium rotates by the rotation of the spindle motor.

A projection (unshown) provided on the carriage assembly 3 is engaged with a groove in the lead screw 4a directly connected to the axis of the stepping motor 4 so that the rotary motion of the stepping motor is changed into the motion in the radial direction of the medium of the carriage assembly 3. Therefore, the magnetic heads 3c and 3d mounted on the carriage assembly 3 are moved in the radial direction of the magnetic recording medium by means of the stepping motor 4, and are positioned above the target truck. The flexible disk unit of the prior art is configured as shown in FIG. 8 and FIG. 9. That is, an outer rotor type spindle motor wherein the driving magnet 1a is located outside the stator 1b and the coil 1c is used, and the carriage assembly 3 is located above the stator 1b, the coil 1c and the driving magnet 1a as shown in FIG. 9.

Since the flexible disk unit of the prior art is configured as described above, the carriage 3 must be made thin to reduce the thickness of the flexible disk unit. However, the magnetic heads 3c and 3d can be made thin to a certain degree in connection with the unshown medium. Furthermore, there is a limit to a reduction in the thicknesses of the driving magnet 1a, the coil 1c and the case 1n of the spindle motor 1 in order to maintain performance. Similarly, the thicknesses of the IC 1h and the connector 1j on the motor substrate 1d cannot be reduced. Thus the disk unit of the prior art is difficult to be made thin.

SUMMARY OF THE INVENTION

In view of the problem of the prior art, it is an object of the present invention to achieve a high-performance flexible disk unit having a structure which permits reduction of its thickness.

In the present invention, a recess is formed by denting a part of the stator toward the inside thereof or by cutting a part of the stator and is free from a coil. The carriage is positioned so that the magnetic heads of the carriage go into the recess. At the same time, a head shield edge (bent portion) for shielding leakage flux in the direction of the above magnetic heads are provided on the side of the spindle motor.

The magnetic heads at the tip of the carriage are positioned in such a way that they can enter the recess of the stator. As a result, the position of the carriage is lowered, thus reducing the thickness of the unit. Furthermore, the influence of leakage flux from the spindle motor on the magnetic heads can be prevented by the head shield portion.

The above and other objects, features, and advantages of the invention will become more apparent from the following description when taken in conjunction with the accompanying drawings.

DESCRIPTION OF THE PREFERRED EMBODIMENT

Referring to the accompanying drawings, an embodiment of the present invention will be described.

Figure 1:
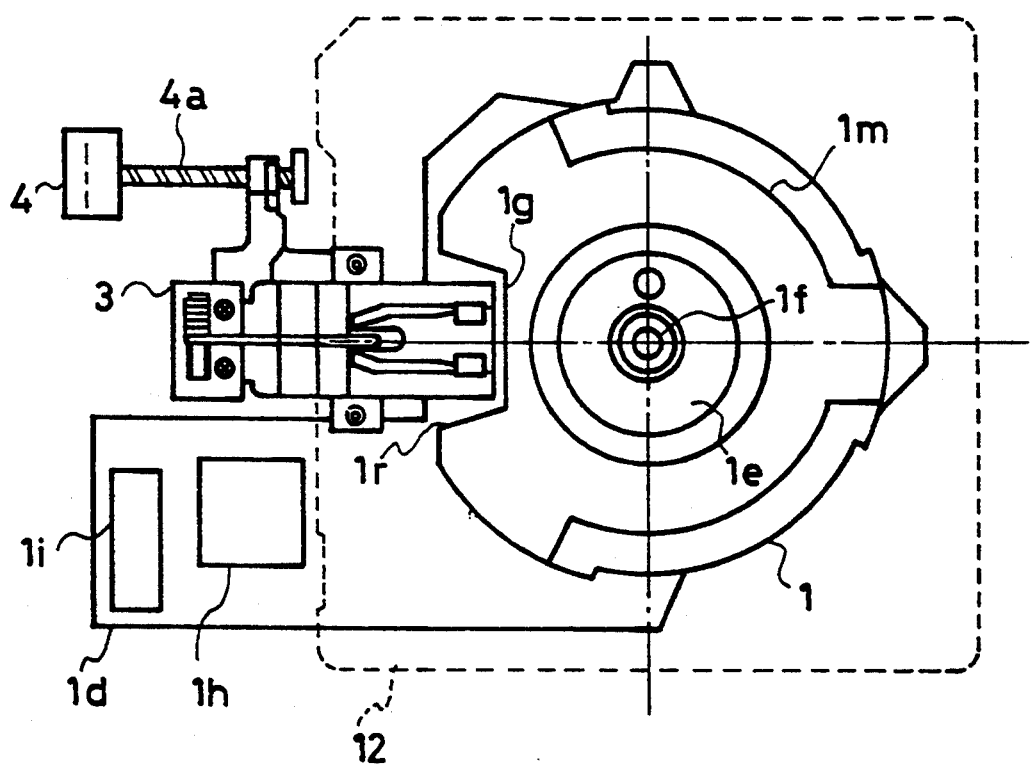
FIGS. 1 to 5 are plan, side, perspective and exploded perspective views of the leakage flux shielding structure of a disk unit according to an embodiment of the present invention.
Figure 2:
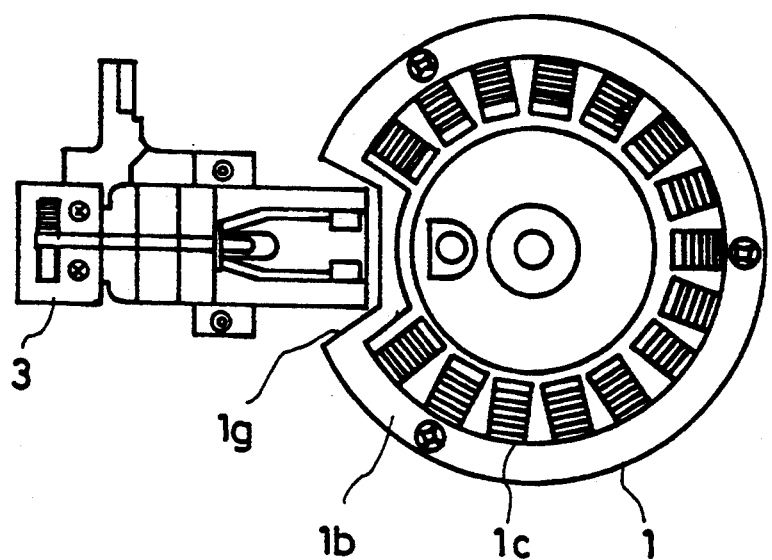
Figure 3:
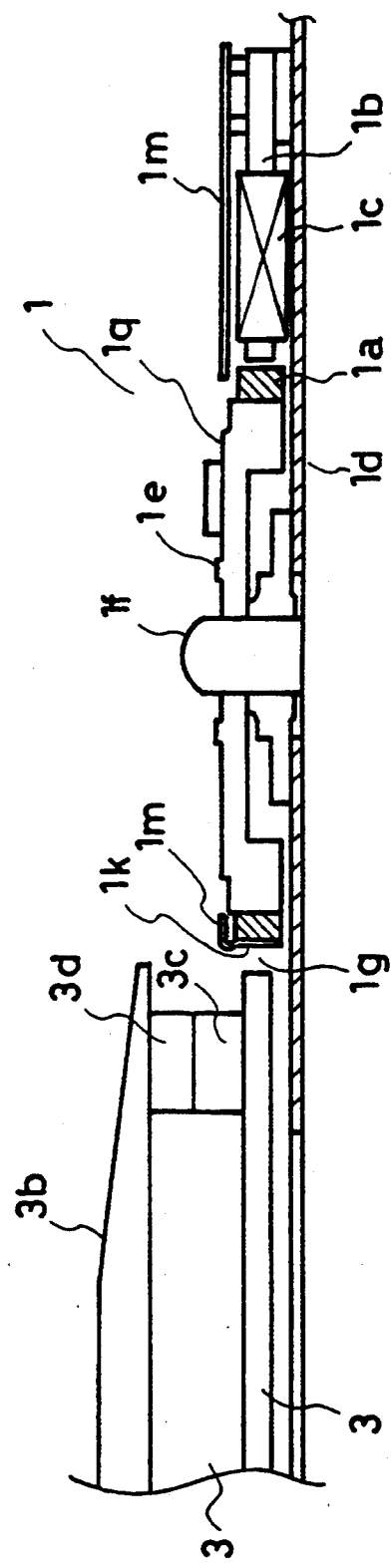
Figure 4:
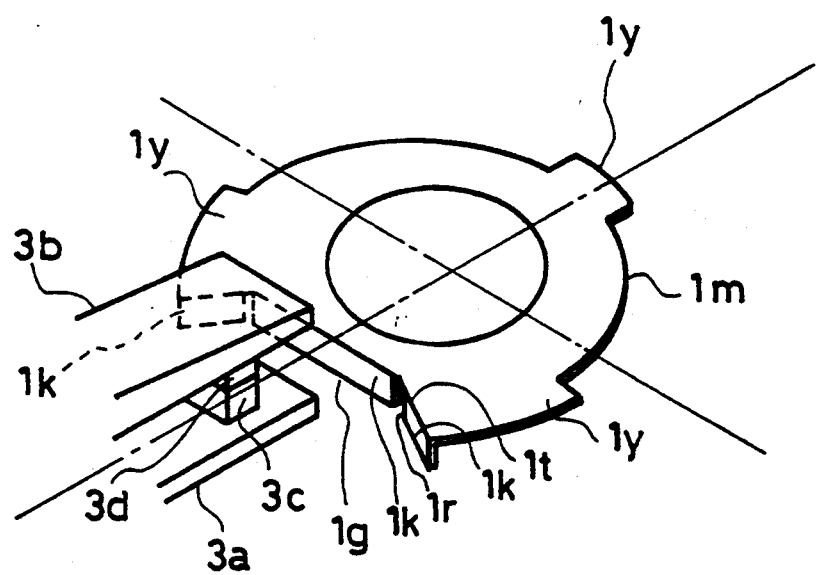
Figure 5:
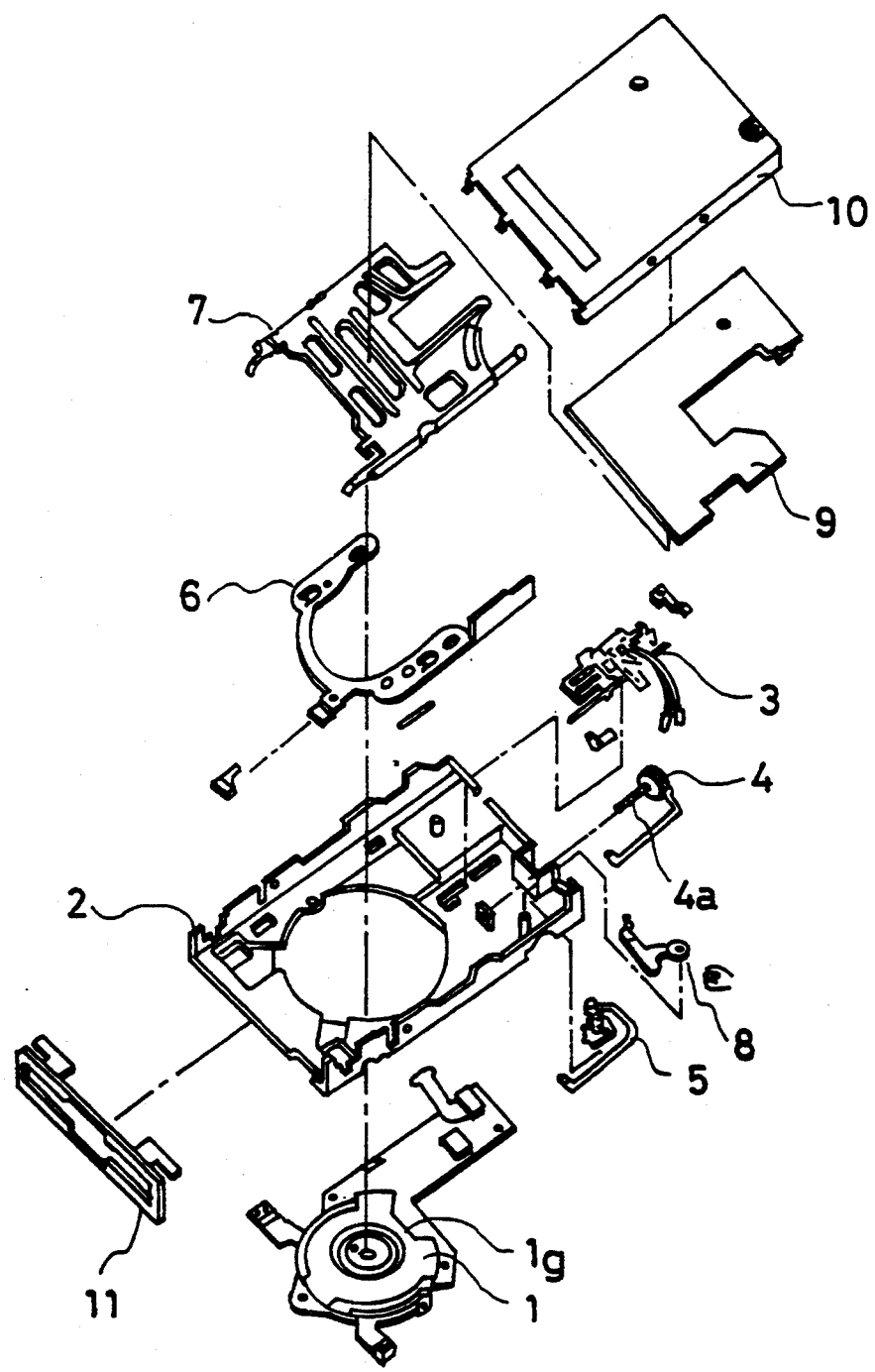

FIGS. 1 to 5 are diagrams showing the embodiment. FIG. 1 is a diagram showing the positional relationship of the spindle motor, carriage, stepping motor and magnetic recording medium. FIG. 2 is a diagram showing the positional relationship of the stator, coil and carriage. FIG. 3 is a sectional view showing the positional relationship between the spindle motor and the carriage. FIG.4 is a diagram showing the shape of the shield plate of the spindle motor. FIG. 5 is a diagram showing the whole configuration of the disk unit. In these figures, reference numeral 1 represents a spindle motor which includes a rotor 1q for rotating a magnetic recording medium 12, 1a driving magnet provided on the outside periphery of the rotor 1q, 1b ring-shaped stator, 1c coil provided on the inside periphery of the stator 1b, and 1d spindle motor substrate. The magnet 1a described above is opposed to the coil 1c. 1e represents a chucking hub, 1f rotation axis, 1g recess free from the coil 1c and formed by denting (recessing) a part of the outside periphery of the stator 1b, which is the feature of the present invention, 1h IC for the spindle motor 1, 1j connector for connecting the substrate 9, and 1k a bent edge of the shield plate which is located at the recess of the shield plate 1m and constitutes a head shield portion. Reference numeral 2 represents a frame, 3 carriage assembly, 3a carriage for mounting a magnetic head 3c, 3b arm for mounting a magnetic head 3d, 4 stepping motor for seeking and positioning the carriage assembly 3 in the radial direction of the medium, 4a lead screw attached to the rotation axis of the stepping motor 4, 5 sensor, 6 slide cam, 7 cartridge holder, 8 lever, 9 substrate, 10 shield cover, and 11 front panel. The shield plate 1m described above is wide enough to cover the coil 1c and shaped like a ring. It has a projection 1y on the outside periphery thereof and fixed on top of the stator 1b, and a recess 1r corresponding to the recess 1g described previously is formed on the shield plate. In this case, a bent portion 1k is formed as a head shield edge by folding the rim of the shield plate 1m where the recess 1r is formed in the direction of the motor substrate 1d.

The operation of the disk unit will be described next. In FIG. 5, when the magnetic recording medium (unshown) is inserted into the unit, the medium is loaded onto the read-write position by a loading mechanism consisting of the slide cam 6, the cartridge holder 7 and the lever 8. The detailed explanation of the loading mechanism is omitted here. When the medium is placed in the loading position, the hub of the medium is chucked by the chucking hub 1e of the spindle motor 1 fixed to the frame 2, and the medium rotates by the rotation of the spindle motor.

A projection (unshown) provided on the carriage assembly 3 is engaged with a groove in the lead screw 4a directly connected to the axis of the stepping motor 4 so that the rotary motion of the stepping motor is changed into the motion in the radial direction of the medium of the carriage assembly 3. Therefore, the magnetic heads 3c and 3d mounted on the carriage assembly 3 can go into the recesses 1g and 1k and move in the radial direction of the magnetic recording medium by means of the stepping motor 4 so that they are positioned above the target truck.

The disk unit according to the present invention is configured as shown in FIG. 1, FIG. 2 and FIG. 3. That is, an inner rotor type spindle motor wherein the driving magnet 1a is located inside the stator 1b and the coil 1c is used, and furthermore a recess 1g free from the coil 1c is formed by denting a part of the outside periphery of the stator 1b toward the inside periphery thereof. When the carriage 3 is positioned on the inside periphery, it goes into the recess 1g described above and is located on the same plane with the stator 1b, the coil 1c and the driving magnet 1a.

Since the bent edge 1k is provided on the carriage 3 side of the shield plate 1m as shown in FIGS. 3 and 4, leakage flux from the motor to the magnetic heads 3c and 3d can be shielded, thus preventing the bad influence of the magnetic heads 3c and 3d on the recording and reproduction of information, It has been explained that the head shield edge is the bent portion formed by folding a part of the shield plate 1m, but an object separate from the shield plate 1m may be attached to the motor substrate 1d to form this.

Figure 6:
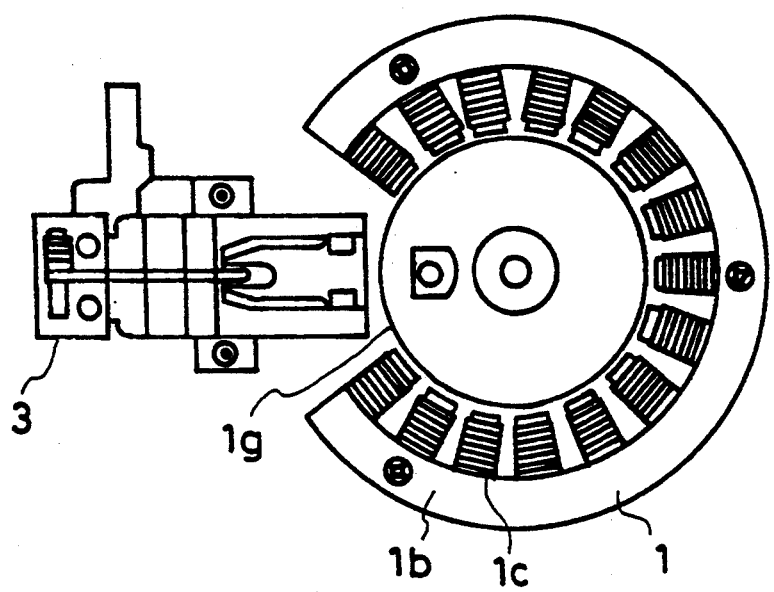
FIGS. 6 and 7 are plan and perspective views of the leakage flux shielding structure of a disk unit according to another embodiment of the present invention.

In the above embodiment, the recess 1g free from the coil 1c is formed by denting a part of the outside periphery of the stator 1b as shown in FIG. 2, but as shown in FIG. 6, an opening free from the coil 1c may be made in the portion of the stator 1b corresponding to the recess 1g.

Figure 7:
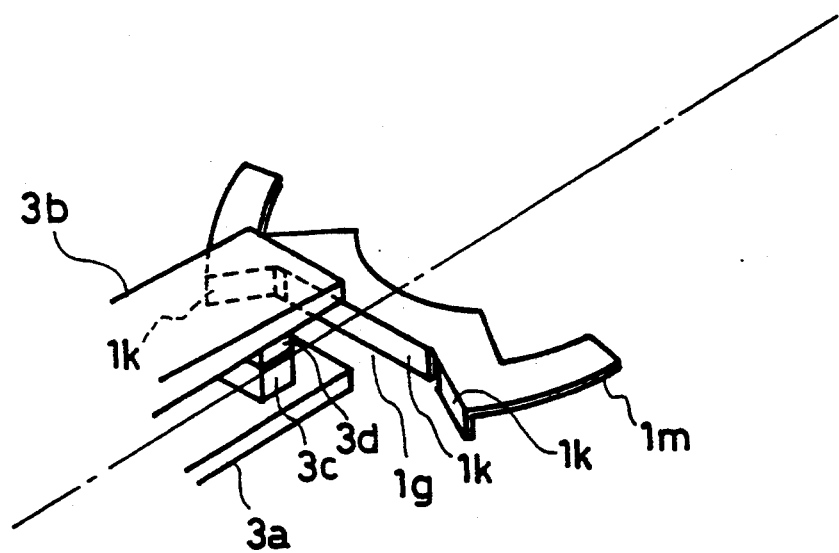
Figure 8:
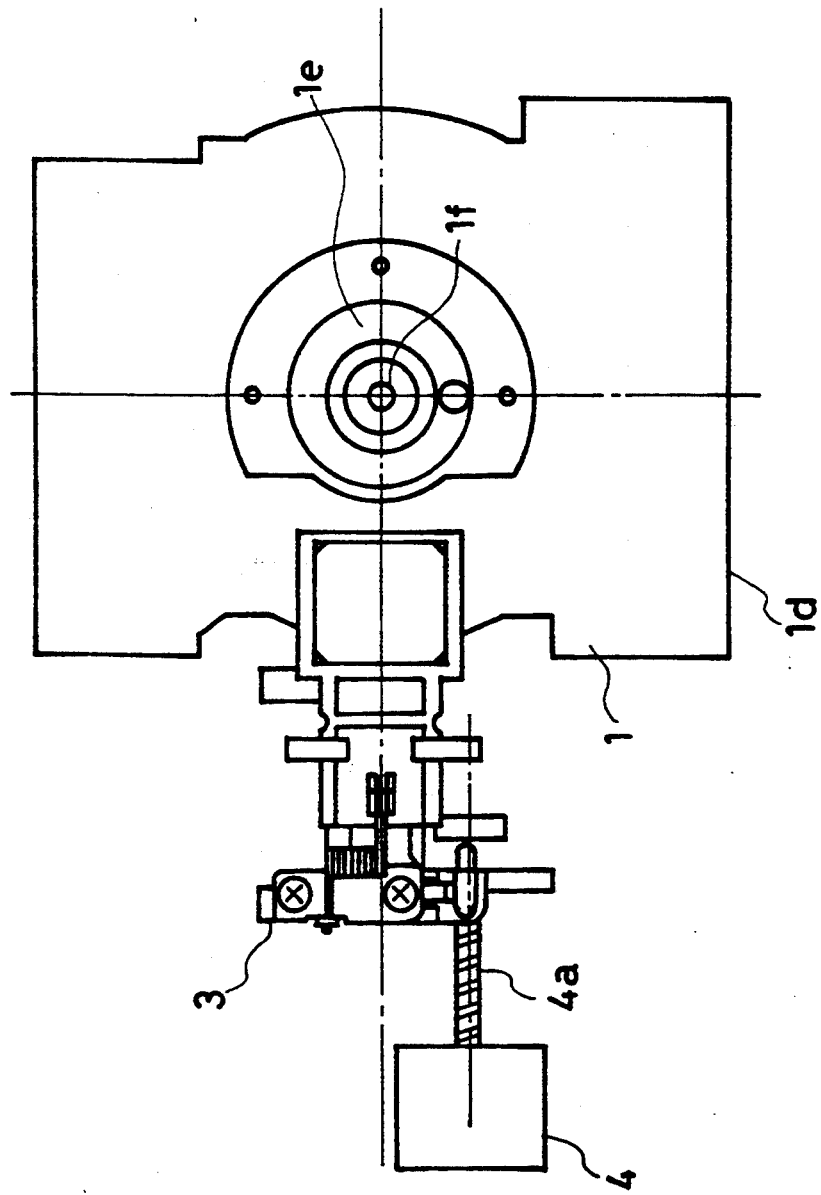
Figs. 8 to 10 are plan, side and exploded perspective views of a flexible disk unit of the prior art.
Figure 9:
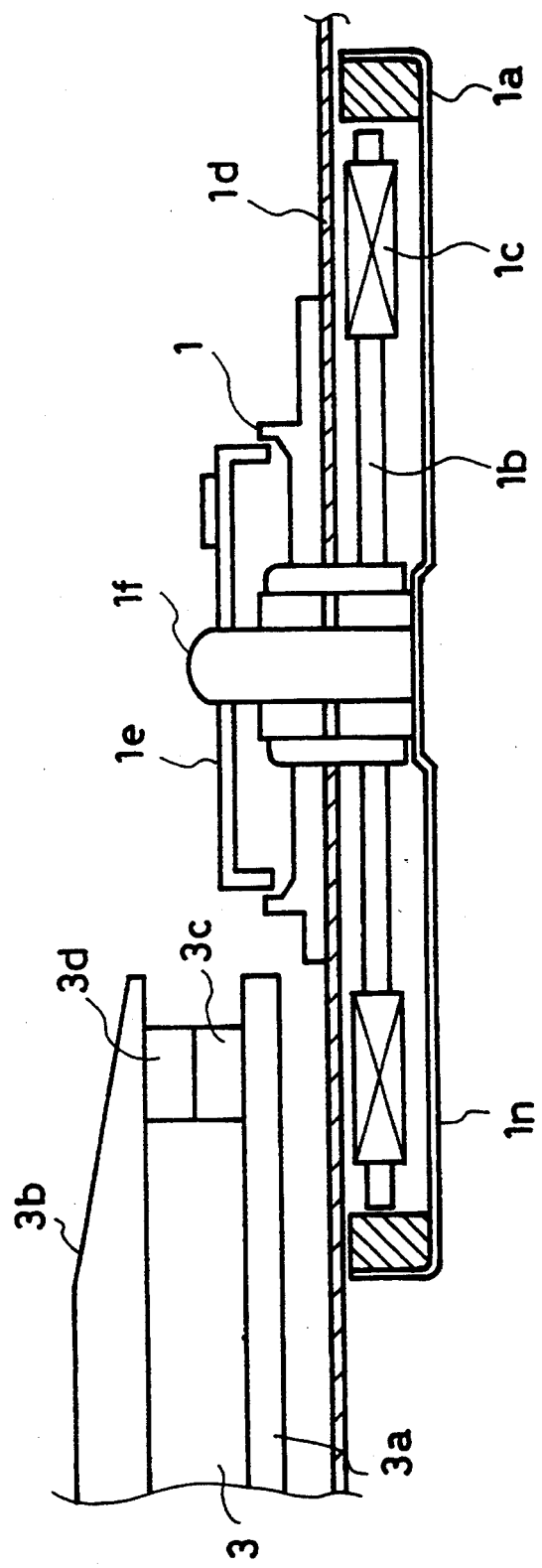
Figure 10:
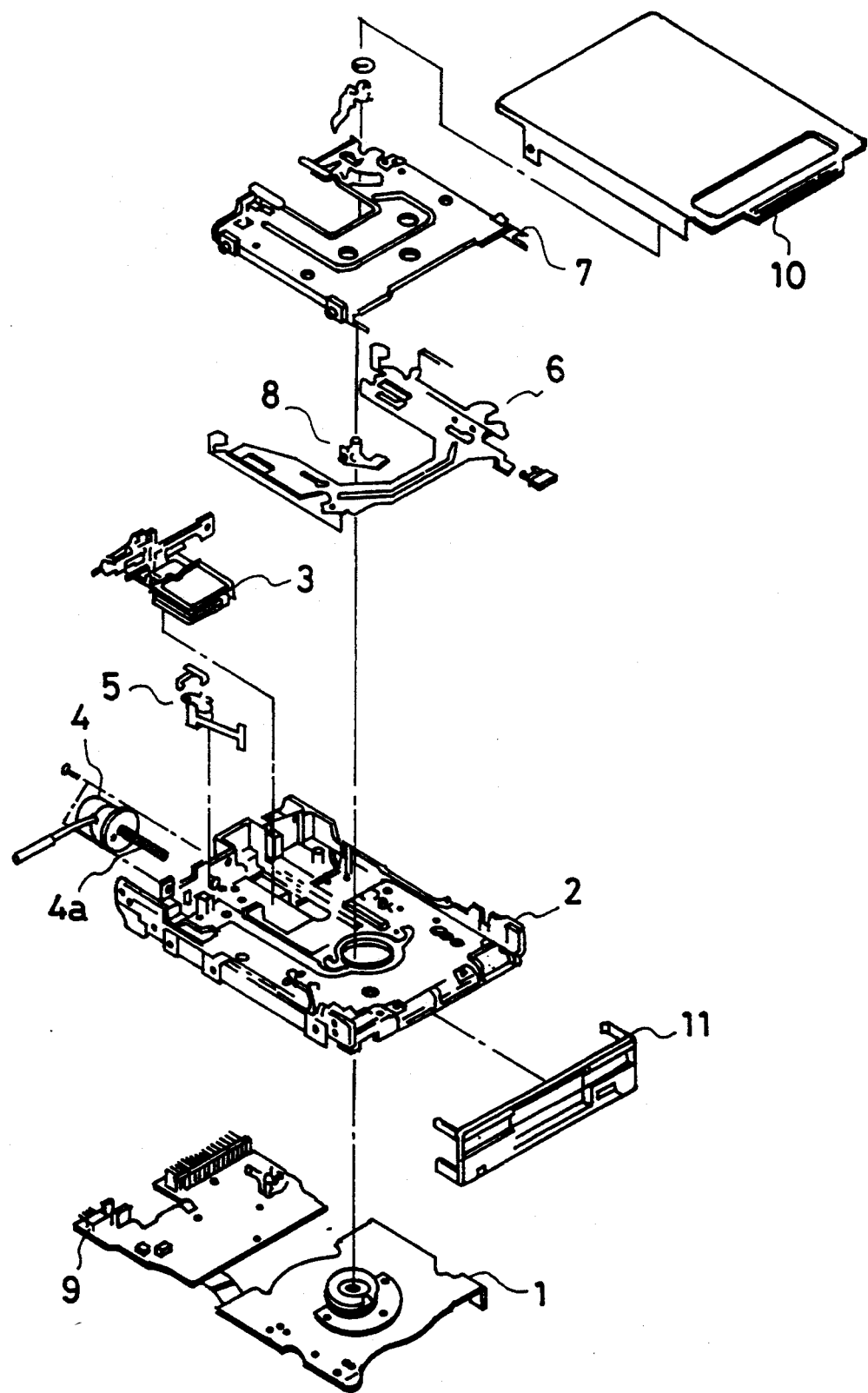

In addition, as shown in FIG. 7, if a bent portion is provided on the carriage side of the shield plate, the same effect can be achieved without shaping the shield plate like a ring.

As described in the foregoing, according to the present invention, in a disk unit comprising a ring-shaped stator having a coil on the inside periphery thereof, & spindle motor supported by a rotation axis and including a rotor for rotating a magnetic recording medium and having a magnet opposed to the coil and provided on the outside periphery of the motor, a carriage having a magnetic head at the tip thereof and supported in such a way that it can move in the radial direction of the magnetic recording medium on the rotor, a recess free from a coil is formed by denting a part of the stator toward the inside thereof or opening it, and the carriage is positioned in such a way that the head of the carriage enters the recess. Furthermore, a head shield portion for shielding leakage flux in the direction of the magnetic head is provided on the side of the spindle motor with the result that flux leaked to the magnetic head of the carriage can be prevented, thus making it effectively possible to achieve a highly reliable disk unit.

What is claimed is:

1. A disk unit, comprising:
 (a) a carriage movable in a radial direction of the magnetic recording medium and having a tip supporting a magnetic head;
 (b) a spindle motor including
  (i) a rotor for rotating a magnetic recording medium and having an outside periphery;
  (ii) a magnet provided on the outside periphery of said rotor;
  (iii) a ring shaped stator having an inside periphery surrounding said rotor and having a surface facing the recording medium, and including means for defining a recess adapted to surround the carriage tip when the carriage is moved toward the magnetic recording medium;
  (iv) a coil provided on the inside periphery of said stator, wherein said magnet is opposed to said coil, and wherein said recess is devoid of any coil;
  (v) a shield plate consisting of a flat portion adapted to cover said coil and disposed on the surface of said stator and a head shield portion disposed between said stator and said magnetic head and provided only along the overall length of the recess for shielding leakage flux from the spindle motor in the direction of the magnetic head.

2. The disk unit according to claim 1, wherein said head shield portion is a bent portion of the shield plate provided along the overall length of and forming said recess in the shield plate.

3. The disk unit according to claim 2, wherein said shield plate has a projection extending parallel with a plane defined by the flat portion and connected to the surface of said stator.

4. The leakage flux shielding structure of claim 1, wherein the head shield portion comprises a plurality of walls, each being orthogonal to the plane defined by the plate portion of the shielding plate.

5. The leakage flux shielding structure of claim 1, wherein the recess is defined by a first line, orthogonal to the radial direction of the magnetic recording medium, and second and third lines, transverse to the first line and the radial direction of the magnetic recording medium, the first and second and third lines being in a plane defined by the flat portion of the shielding plate, and wherein the head shield portion is comprised of a first wall, formed along the first line and orthogonal to the plane of the flat portion of the shield plate, a second wall formed along the second line orthogonal to the plane of the ring-shaped stator, and a third wall, formed along the third line, and orthogonal to the plane of the ring-shaped stator.

6. The leakage flux shielding structure of claim 5, wherein the first, second and third walls are all attached to the flat portion of the shield plate.

7. The leakage flux shielding structure of claim 5, wherein the first and second walls define a slit therebetween, and wherein the first and third walls define a slit therebetween.

8. A disk unit, having a leakage flux shielding structure, comprising:
- a spindle motor including a ring shaped stator having coils on an inside periphery thereof, and a rotor for rotating a magnetic recording medium supported by a rotary shaft, and having a magnet opposed to said coils and provided on an outside periphery of the rotor, and wherein a recess is formed in a part of said ring shaped stator towards and inside thereof such that the recess is devoid of any coil,
- a carriage adapted to be guided in the radial direction of said magnetic recording medium on said rotor and having a tip and a magnetic head attached to the tip, said carriage being positioned so that the magnetic head on the tip of said carriage is capable of being moved into the recess, and
- a shielding plate consisting of a flat portion provided to cover all the coils of the stator and a head shielding portion for shielding leakage flux from the spindle motor in the direction of the magnetic head is provided on said spindle motor, wherein said head shielding portion is provided along and in close contact with said recess formed on a part of said stator and is extended downward.

9. The disk unit of claim 8, wherein the flat portion of the shielding plate is ring-shaped and has a recess corresponding to the recess of said stator, and said head shielding portion is provided along and in close contact with the periphery of the recess of said ring-shaped shielding plate and consists of a bent portion formed by bending an edge of said flat portion.

10. The disk unit of claim 9, wherein said ring shaped shielding plate has a projection extending outward and parallel with the flat portion and is fixed on top of said stator.

11. The disk unit of claim 8, wherein the flat portion is provided to cover part of the coils only in the vicinity of the recess of said stator, and has a recess corresponding to the recess of said stator, and said head shielding portion is provided along and in close contact with the periphery of the recess of said shielding plate and consists of a bent portion formed by bending an edge of said flat portion.

12. The leakage flux shielding structure of claim 8, wherein the head shielding portion comprises a plurality of walls, each being orthogonal to the plane defined by the flat portion of the shielding plate.

13. The leakage flux shielding structure of claim 8, wherein the recess is defined by a first line, orthogonal to the radial direction of the magnetic recording medium, and second and third lines, transverse to the first line and the radial direction of the magnetic recording medium, the first and second and third lines being in a plane defined by the flat portion of the shielding plate, and wherein the head shielding portion is comprised of a first wall, formed along the first line and orthogonal to the plane of the flat portion shielding plate, a second wall formed along the second line orthogonal to the plane of the flat portion of the shielding plate, and a third wall, formed along the third line, and orthogonal to the plane of the flat portion of the shielding plate.

14. The leakage flux shielding structure of claim 13, wherein the first, second and third walls are all attached to the flat portion of the shielding plate.

15. A shield plate for shielding leakage flux in a disk unit for use with a magnetic recording medium including a spindle motor having a rotor for rotating a magnetic recording medium and having a magnet provided on the outside periphery of the rotor, a ring shaped stator surrounding the rotor and having a surface facing the recording medium and including means for defining a recess adapted to surround the tip of the carriage when the tip is moved toward the magnetic recording medium, and a coil provided on the inside periphery of the stator, wherein the magnet is opposed to the coil and the recess is devoid of any coil, the shield plate consisting of:
- a flat portion adapted to cover the coil and disposed on the surface of the stator, and including means defining a recess corresponding to the recess on the stator, and
- a head shield portion provided only along the recess in the flat portion and disposed between the stator and the magnetic head for shielding leakage flux from the spindle motor in the direction of the magnetic head.

16. The shield plate of claim 15, wherein the head shield portion is formed by bending a portion of the flat portion.

17. The shield plate of claim 15, wherein the flat portion is ring shaped.

18. The shield plate of claim 15 wherein the head shield portion is formed along the overall length of the recess.

19. The shield plate of claim 15, wherein the head shield portion comprises a plurality of walls, each being orthogonal to a plane defined by the flat portion.

20. The leakage flux shielding structure of claim 15, wherein the recess is defined by a first line, orthogonal to the radial direction of the magnetic recording medium, and second and third lines, transverse to the first line and the radial direction of the magnetic recording medium, the first and second and third lines being in a plane defined by the flat portion, and wherein the head shielding portion is comprised of a first wall, formed along the first line and orthogonal to the plane of the flat portion, a second wall formed along the second line orthogonal to the plane of the flat portion, and a third wall, formed along the third line, and orthogonal to the plane of the flat portion.

21. The shield plate of claim 20, wherein the flat portion has a projection extending parallel with the flat portion on the surface of the stator.

22. A leakage flux shielding structure of a disk unit, comprising:
(a) a carriage movable in a radial direction of the magnetic recording medium and having a tip supporting a magnetic head;
(b) a spindle motor including
(i) a rotor for rotating a magnetic recording medium and having an outside periphery;

(ii) a magnet provided on the outside periphery of said rotor;

(iii) a ring shaped stator having an inside periphery surrounding said rotor, and having a surface facing the recording medium, and including means for defining a recess adapted to surround the carriage tip when the carriage is moved toward the magnetic recording medium;

(iv) a coil provided on the inside periphery of said stator, wherein said magnet is opposed to said coil, and wherein said recess is devoid of a coil; and (v) a shield plate comprising a flat portion having a first outer peripheral edge which is substantially concave and has a substantially similar shape to the recess in the stator and a second outer peripheral edge defining an open edge of the shield plate; and (vi) a head shield portion disposed between the stator and the magnetic head and provided along the overall length of the recess for shielding leakage flux from the motor in the direction of the magnetic head.

23. The disk unit of claim 22, further comprising:
a substrate which supports the spindle motor; and
wherein the head shield portion is attached to the substrate.

24. The disk unit of claim 23, wherein the shield plate is ring-shaped.

25. The disk unit of claim 24, wherein the shield plate includes a projection extending parallel with the plane defined by the flat portion and is attached to said stator.

26. The disk unit of claim 25, wherein the stator is substantially ring-shaped and has an outer peripheral edge along the overall length of the recess.

27. The disk unit of claim 25, wherein the stator has first and second outer peripheral edges defining an opening in the stator, wherein the opening defines the recess.

28. The disk unit of claim 24, wherein the stator is substantially ring-shaped and has an outer peripheral edge along the overall length of the recess.

29. The disk unit of claim 24, wherein the stator has first and second outer peripheral edges defining an opening in the stator, wherein the opening defines the recess.

30. The disk unit of claim 23, wherein the second outer peripheral edge of the shield plate has a first convex portion and a second substantially concave portion.

31. The disk unit of claim 30, wherein the shield plate includes a projection extending parallel with the plane defined by the plate portion and is attached to said stator.

32. The disk unit of claim 31, wherein the stator is substantially ring-shaped and has an outer peripheral edge along the overall length of the recess.

33. The disk unit of claim 31, wherein the stator has first and second outer peripheral edges defining an opening in the stator, wherein the opening defines the recess.

34. The disk unit of claim 30, wherein the stator is substantially ring-shaped and has an outer peripheral edge along the overall length of the recess.

35. The disk unit of claim 30, wherein the stator has first and second outer peripheral edges defining an opening in the stator, wherein the opening defines the recess.

36. The disk unit of claim 22, wherein the head shield portion is attached to the first peripheral edge of the shield plate.

37. The disk unit of claim 36, wherein the shield plate is ring-shaped.

38. The disk unit of claim 37, wherein the shield plate includes a projection extending parallel with the plane defined by the flat portion and is attached to said stator.

39. The disk unit of claim 38, wherein the stator is substantially ring-shaped and has an outer peripheral edge along the overall length of the recess.

40. The disk unit of claim 38, wherein the stator has first and second outer peripheral edges defining an opening in the stator, wherein the opening defines the recess.

41. The disk unit of claim 37, wherein the stator is substantially ring-shaped and has an outer peripheral edge along the overall length of the recess.

42. The disk unit of claim 37, wherein the stator has first and second outer peripheral edges defining an opening in the stator, wherein the opening defines the recess.

43. The disk unit of claim 36, wherein the second outer peripheral edge of the shield plate has a first convex portion and a second substantially concave portion.

44. The disk unit of claim 43, wherein the shield plate includes a projection extending parallel with the plane defined by the flat portion and is attached to said stator.

45. The disk unit of claim 44, wherein the stator is substantially ring-shaped and has an outer peripheral edge along the overall length of the recess.

46. The disk unit of claim 45, wherein the stator has first and second outer peripheral edges defining an opening in the stator, wherein the opening defines the recess.

47. The disk unit of claim 43, wherein the stator is substantially ring-shaped and has an outer peripheral edge along the overall length of the recess.

48. The disk unit of claim 43, wherein the stator has first and second outer peripheral edges defining an opening in the stator, wherein the opening defines the recess.

49. The disk unit of claim 22, wherein the shield plate is ring-shaped.

50. The disk unit of claim 49, wherein the shield plate includes a projection extending parallel with the plane defined by the flat portion and is attached to said stator.

51. The disk unit of claim 50, wherein the stator is substantially ring-shaped and has an outer peripheral edge along the overall length of the recess.

52. The disk unit of claim 50, wherein the stator has first and second outer peripheral edges defining an opening in the stator, wherein the opening defines the recess.

53. The disk unit of claim 49, wherein the stator is substantially ring-shaped and has an outer peripheral edge along the overall length of the recess.

54. The disk unit of claim 49, wherein the stator has first and second outer peripheral edges defining an opening in the stator, wherein the opening defines the recess.

55. The disk unit of claim 22, wherein the second outer peripheral edge of the shield plate has a first convex portion and a second substantially concave portion.

56. The disk unit of claim 55, wherein the shield plate includes a projection extending parallel with the plane defined by the flat portion and is attached to said stator.

57. The disk unit of claim 56, wherein the stator is substantially ring-shaped and has an outer peripheral edge along the overall length of the recess.

58. The disk unit of claim 56, wherein the stator has first and second outer peripheral edges defining an opening in the stator, wherein the opening defines the recess.

59. The disk unit of claim 55, wherein the stator is substantially ring-shaped and has an outre peripheral edge along the overall length of the recess.

60. The disk unit of claim 55, wherein the stator has first and second outer peripheral edges defining an opening in the stator, wherein the opening defines the recess.

61. The disk unit of claim 22, wherein the shield plate includes a projection extending parallel with the plane defined by the flat portion and is attached to said stator.

62. The disk unit of claim 61, wherein the stator is substantially ring-shaped and has an outer peripheral edge along the overall length of the recess.

63. The disk unit of claim 61, wherein the stator has first and second outer peripheral edges defining an opening in the stator, wherein the opening defines the recess.

64. The disk unit of claim 22, wherein the stator is substantially ring-shaped and has an outer peripheral edge along the overall length of the recess.

65. The disk unit of claim 22, wherein the stator has first and second outer peripheral edges defining an opening in the stator, wherein the opening defines the recess.

* * * * *